United States Patent
Baucco (10) Patent No.: US 10,577,977 B2
(45) Date of Patent: Mar. 3, 2020

(54) TURBINE SHROUD WITH BIASED RETAINING RING

(71) Applicant: Rolls-Royce Corporation, Indianapolis, IN (US)

(72) Inventor: Alexandra R. Baucco, Indianapolis, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 633 days.

(21) Appl. No.: 15/439,502

(22) Filed: Feb. 22, 2017

(65) Prior Publication Data

US 2018/0238193 A1 Aug. 23, 2018

(51) Int. Cl.
*F01D 25/24* (2006.01)
*F01D 11/00* (2006.01)

(52) U.S. Cl.
CPC .......... *F01D 25/246* (2013.01); *F01D 11/005* (2013.01); *F05D 2240/11* (2013.01); *F05D 2260/30* (2013.01); *F05D 2300/6033* (2013.01); *Y02T 50/672* (2013.01)

(58) Field of Classification Search
CPC ...... F01D 25/246; F01D 11/005; F01D 11/16; F01D 11/22; F01D 11/025; F01D 11/14; F05D 2240/11; F05D 2260/30; F05D 2300/6033; Y02T 50/672
See application file for complete search history.

(56) References Cited

U.S. PATENT DOCUMENTS

| 1,423,466 | A | | 7/1922 | Snyder |
| 3,375,016 | A | | 3/1968 | Jellinek et al. |
| 3,661,197 | A | | 5/1972 | Peterson |
| 3,990,813 | A | | 11/1976 | Imai et al. |
| 4,635,896 | A | | 1/1987 | Baker |
| 5,079,915 | A | * | 1/1992 | Veau ........................ F02K 1/822 60/753 |
| 5,188,506 | A | | 2/1993 | Creevy |
| 5,971,703 | A | * | 10/1999 | Bouchard ............. F01D 25/246 415/135 |
| 5,988,975 | A | | 11/1999 | Pizzi |
| 6,378,873 | B1 | * | 4/2002 | Mayer ..................... F16J 15/28 277/355 |

(Continued)

FOREIGN PATENT DOCUMENTS

| EP | 0924387 A2 | 6/1999 |
| EP | 1965030 A2 | 9/2008 |

(Continued)

OTHER PUBLICATIONS

European Search Report completed on Apr. 23, 2018 and issued in connection with Patent Application No. 18153185.6.

(Continued)

*Primary Examiner* — Kenneth Bomberg
*Assistant Examiner* — Andrew Thanh Bui
(74) *Attorney, Agent, or Firm* — Barnes & Thornburg LLP (57) ABSTRACT

An assembly adapted for use in a gas turbine engine has a plurality of segments arranged to form an annular shape and seal elements arranged circumferentially between the segments. The assembly further includes retention means for restraining movement of the plurality of seal members in the radial direction away from a central axis and out of position relative to the plurality of segments.

20 Claims, 6 Drawing Sheets

(56) References Cited

U.S. PATENT DOCUMENTS

| | | |
|---|---|---|
| 6,464,456 B2 | 10/2002 | Darolia et al. |
| 6,808,363 B2 | 10/2004 | Darkins, Jr. et al. |
| 6,832,484 B2 | 12/2004 | Hofmann et al. |
| 6,893,214 B2 * | 5/2005 | Alford .................. F01D 9/04 415/138 |
| 7,080,513 B2 | 7/2006 | Reichert |
| 7,347,425 B2 | 3/2008 | James |
| 7,360,769 B2 | 4/2008 | Bennett |
| 7,374,395 B2 | 5/2008 | Durocher et al. |
| 7,520,721 B2 | 4/2009 | Hamlin et al. |
| 7,744,096 B2 | 6/2010 | Kono |
| 7,771,159 B2 | 8/2010 | Johnson et al. |
| 7,870,738 B2 | 1/2011 | Zborovsky et al. |
| 8,047,550 B2 | 11/2011 | Behrens et al. |
| 8,047,773 B2 | 11/2011 | Bruce et al. |
| 8,079,600 B2 | 12/2011 | Shojima et al. |
| 8,157,511 B2 | 4/2012 | Pietrobon et al. |
| 8,303,245 B2 | 11/2012 | Foster et al. |
| 8,790,067 B2 | 7/2014 | McCaffrey et al. |
| 9,347,333 B2 * | 5/2016 | Mindock, III ........ F01D 11/003 |
| 2004/0195783 A1 | 10/2004 | Akagi et al. |
| 2008/0069688 A1 | 3/2008 | Harper et al. |
| 2009/0097980 A1 | 4/2009 | Hayasaka et al. |
| 2012/0070272 A1 | 3/2012 | Prehn |
| 2013/0156550 A1 | 6/2013 | Franks et al. |
| 2013/0202433 A1 | 8/2013 | Hafner |
| 2016/0222812 A1 | 8/2016 | Sippel et al. |
| 2016/0245108 A1 | 8/2016 | Sippel et al. |
| 2016/0290145 A1 | 10/2016 | Roussille et al. |
| 2016/0348521 A1 | 12/2016 | Sippel et al. |

FOREIGN PATENT DOCUMENTS

| | | |
|---|---|---|
| EP | 2728125 A1 | 5/2014 |
| EP | 2775103 A2 | 9/2014 |
| EP | 3037628 A1 | 6/2016 |
| FR | 2980235 B1 | 4/2015 |
| JP | 58176402 A | 10/1983 |
| JP | 2000204901 A | 7/2000 |
| JP | 5776208 B2 | 9/2015 |
| WO | 00/12920 A1 | 3/2000 |
| WO | 20140186099 A1 | 11/2014 |
| WO | 2015002673 A2 | 1/2015 |

OTHER PUBLICATIONS

GE Aviation, Jefferies Investor Visit, dated May 12, 2014, 78 pg. (p. 32).

* cited by examiner

TURBINE SHROUD WITH BIASED RETAINING RING

FIELD OF THE DISCLOSURE

The present disclosure relates generally to gas turbine engines, and more specifically to turbine shrouds and other assemblies included in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds and other assemblies in gas turbine engines include components made from materials that have different coefficients of thermal expansion. Due to the differing coefficients of thermal expansion, the components can expand at different rates when exposed to combustion products. In some examples, sealing between and coupling such components can present challenges.

SUMMARY

The present disclosure may comprise one or more of the following features and combinations thereof.

According to the present disclosure, a turbine shroud assembly adapted for use in a gas turbine engine is described. The assembly may include a plurality of blade track segments comprising ceramic matrix composite materials and arranged around a central axis to form an annular shape and a plurality of seal members. Each blade track segment may include a runner that extends part way around the central axis. Each runner may be formed to include chamfered surfaces at opposing circumferential ends that extend inward in a radial direction from a radially outer surface of the runner. The seal members may be arranged in channels formed by the chamfered surfaces of the runners when the plurality of blade track segments are arranged around the central axis In illustrative embodiments, the assembly may include a retaining ring that extends around the plurality of blade track segments and the plurality of seal members. The retaining ring may be sized to restrain movement of the plurality of seal members in the radial direction away from the central axis and out of the channels formed by the chamfered surfaces of the runners included in the plurality of blade track segments.

In illustrative embodiments, the retaining ring may be a full hoop coil spring. The full hoop coil spring may engage the radially outer surface of the runner included in each of the plurality of blade track segments. Each of the plurality of blade track segments may include features configured to block axial movement of the full hoop coil spring in at least one direction along the axis to a position out of contact with the plurality of blade track segments.

In illustrative embodiments, the retaining ring may be a split ring formed to include an expandable gap configured to accommodate thermal growth of the plurality of blade track segments during use in the gas turbine engine. The cross sectional shape of the split ring may be one of rectangular, barreled, and chamfered. The gap may be shaped to extend parallel to the central axis, to extend at an angle relative to the axis, to form a zig-zag, to form an overlapping joint, or to form an interlocking joint.

According to another aspect of the present disclosure, a generic assembly adapted for use in a gas turbine engine is taught. The assembly may include a plurality of segments comprising ceramic matrix composite materials and a plurality of seal members configured to seal between segments. The plurality of segments may be arranged around a central axis to form an annular shape. Each segment may be shaped to extend partway around the central axis and may be formed to include chamfered surfaces at opposing circumferential ends that extend inward in a radial direction from a radially outer surface. The plurality of seal members may be arranged in channels formed by the chamfered surfaces of the segments.

In illustrative embodiments, the assembly includes a retaining ring that extends around the segments and the plurality of seal members. The retaining ring may be sized and arranged to restrain movement of the plurality of seal members in the radial direction away from the central axis and out of the channels formed by the chamfered surfaces of the segments.

In some illustrative embodiments, the retaining ring is a full hoop coil spring. In some illustrative embodiments, the retaining ring is a split ring formed to include an expandable gap These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
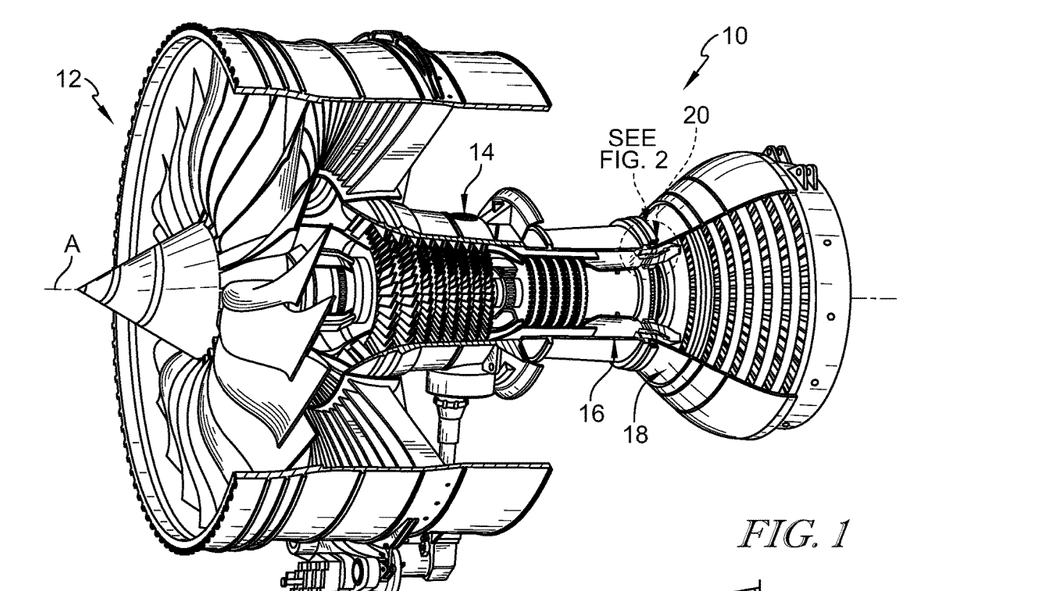
FIG. 1 is a cut-away perspective view of a gas turbine engine showing that the exemplary engine includes a fan driven by an engine core having a compressor, a combustor, and a turbine.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis A and drive the compressor 14 and the fan 12.

Figure 2:
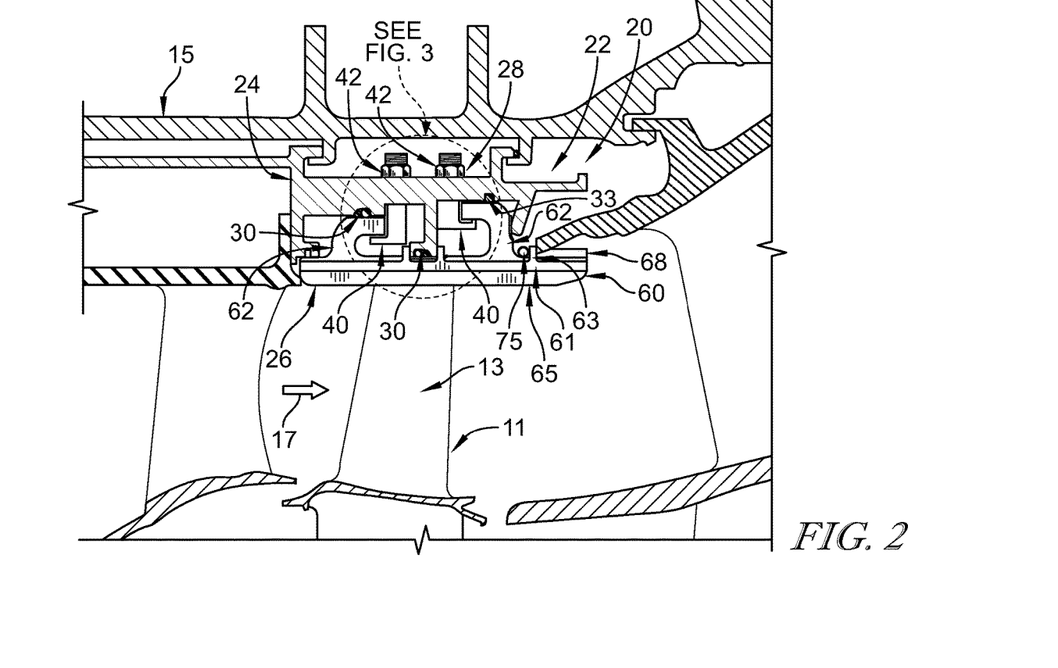
FIG. 2 is a partial cross-sectional view of the gas turbine engine of FIG. 1 showing the arrangement of a segmented turbine shroud radially outward from blades of a turbine wheel assembly to suggest that the turbine shroud blocks gasses from passing over the blades without interacting with the blades.

The turbine 18 includes at least one turbine wheel assembly 11 and a turbine shroud 20 positioned to surround the turbine wheel assembly 11 as shown in FIGS. 1 and 2. The turbine shroud 20 is coupled to an outer case 15 of the gas turbine engine 10. The turbine wheel assembly 11 includes a plurality of blades 13 coupled to a rotor disk for rotation therewith. The hot, high pressure combustion products from the combustor 16 are directed toward the blades 13 of the turbine wheel assemblies 11 along a flow path 17. The blades 13 are in turn pushed by the combustion products to cause the turbine wheel assembly 11 to rotate; thereby, driving the rotating components of the compressor 14 and/or the fan 12.

Figure 3:
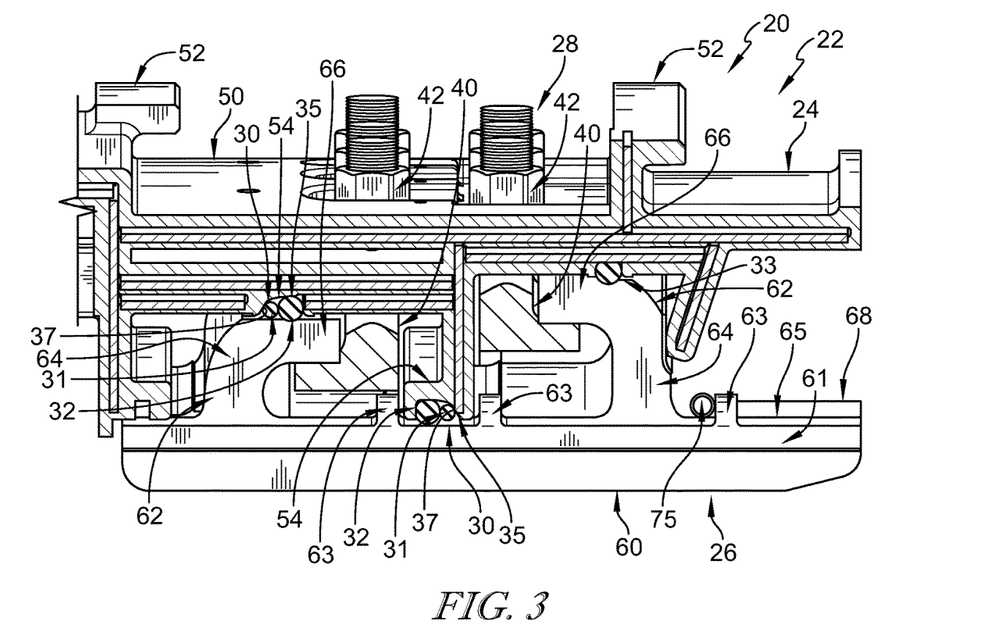
FIG. 3 is a detail view of a portion of FIG. 2 showing a turbine shroud segment that includes a carrier segment, a blade track segment, blade track sealing elements or rods, and a coil spring configured to bias the blade track sealing elements inward in a radial direction toward a central axis of the engine.
Figure 4:
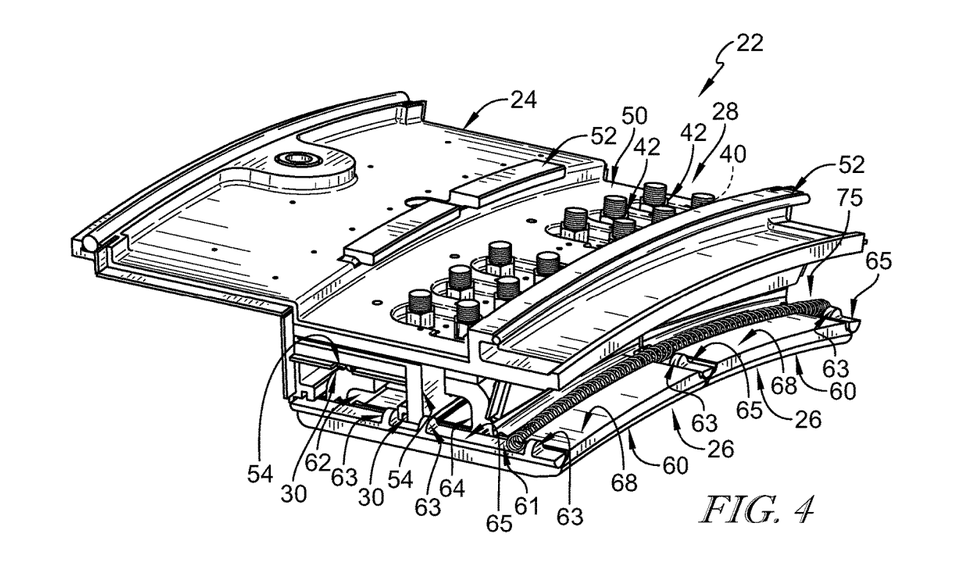
FIG. 4 is a perspective view of the turbine shroud segment of FIGS. 2 and 3 showing that the assembled turbine shroud segment is generally arcuate and extends part way around a central axis and showing that the blade track sealing elements are received in channels formed between blade track segments while the coil spring resists movement of seal members in the radial direction away from the central axis and out of the channels formed by the blade track segments.

The turbine shroud 20 extends around the turbine wheel assembly 11 to block combustion products from passing over the blades 13 without pushing the blades 13 to rotate as suggested in FIG. 2. In the illustrative embodiment, the turbine shroud 20 is made up of a number of shroud segments 22, one of which is shown in FIGS. 3 and 4, that extend only part-way around the central axis A and cooperate to surround the turbine wheel assembly 11. The shroud segments 22 are sealed against one another, such as by strip seal members, to provide a continuous turbine shroud 20. In other embodiments, the turbine shroud 20 is annular and non-segmented to extend fully around the central axis A and surround the turbine wheel assembly 11. In yet other embodiments, certain components of the turbine shroud 20 are segmented while other components are annular and non-segmented.

Each shroud segment 22 includes a carrier segment 24, a pair of blade track segments 26, a mounting system 28, and a circumferential seal member 65 as shown in FIGS. 2-5. The carrier segment 24 is a metallic component mounted in engine 10 and is configured to support the blade track segment 26 in position adjacent to the blades 13 of the turbine wheel assembly 11. The blade track segments 26 are substantially similar and are ceramic-matrix composite components adapted to withstand high temperatures and directly faces blades 13 that interface with high temperature gasses. The mounting system 28 is configured to couple the blade track segments 26 to the carrier segment 24 such that the blade track segments 26 are properly located. The circumferential seal members 65 block leakage of gas into and out of a gas path 17 defined by the blade track segments 26.

Figure 5:
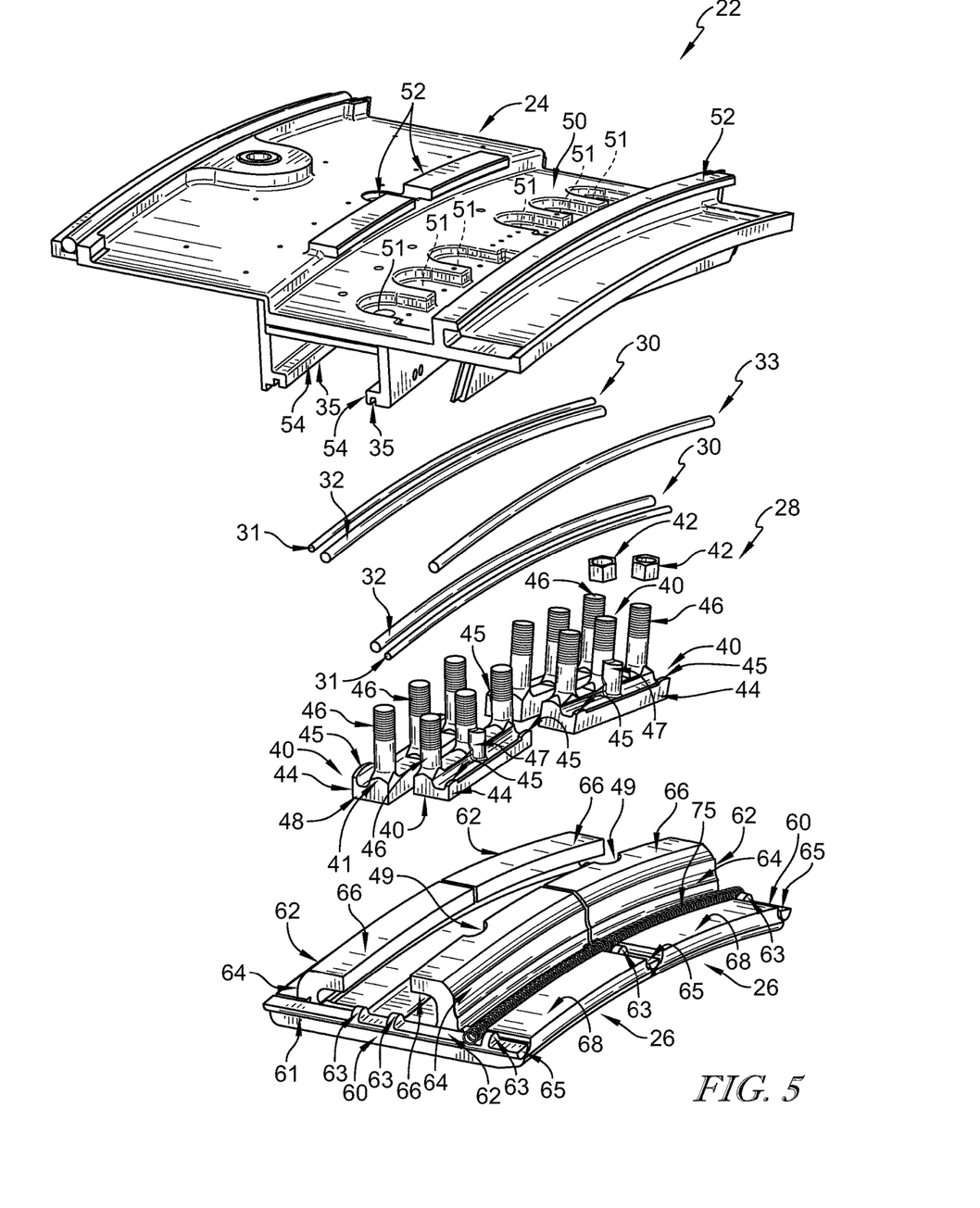
FIG. 5 is an exploded perspective assembly view of the turbine shroud segment of FIGS. 3 and 4 showing that the coil spring is axially retained in place by radially extending features of the blade track segments and the blade track sealing elements.

Circumferential seal members 65 are retained between blade track segments 26, at least in part, by retaining ring 75 as shown in FIG. 5. The circumferential seal members 65 are illustratively received in channels formed by chamfers 67 formed at circumferential ends of runners 60 included in each blade track segment 26. The circumferential seal members 65 have a half cylinder portion 61 received in the channels and locating fins 63 that extend radially out from the channel.

In the illustrative embodiment, the retaining ring 75 is provided by a full hoop canted coil spring as shown in FIGS. 4-7. The retaining ring 75, provided by the canted coil or garter spring, exerts a radially-inward force on blade track segments 26 and restrains seal members 65 from radial movement out of position. Retaining ring 75 is elastic and is configured to expand and contract to accommodate thermal growth of the blade track segments 26 during use in the engine 10.

The retaining ring 75 is arranged aft of the mounting system 28 as shown in the exemplary design of FIGS. 2 and 3. In this embodiment, a locating fins 63 of the seal member 65 is arranged aft of the retaining ring 75 as shown in FIGS. 2 and 3. The locating fin 63 is configured to block movement of the retaining ring 75 aft along the axis A out of proper position for holding circumferential seal members 65 in place relative to seal segments 26. In other embodiments, other locating fins 63 may be included forward of the retaining ring 75 to block movement of the retaining ring 75 forward along axis A.

Turbine shroud segments 22 of the present disclosure also include a plurality of tandem seals 30 as shown in FIGS. 2-5. The tandem seals 30 are arranged radially between the carrier segment 24 and the blade track segments 26 such that they block the flow of gasses between the carrier segment 24 and the blade track segment 26. In the illustrative embodiment, the tandem seals 30 are configured to accommodate differing rates of expansion and contraction experienced by the carrier segment 24 and the blade track segments 26 during use of the shroud segment 22 in engine 10. Each tandem seal 30 includes a wire seal 31 and a rope seal 32 that are both arranged in a single seal-receiving channel 35 as shown in FIG. 5. The rope seal 32 is compressed between the carrier segment 24 and the blade track segment 26 to push the wire seal 31 into position engaging both the carrier segment 24 and the blade track segment 26 to close a gap between the components.

The mounting system 28 is configured to couple the blade track segments 26 to a corresponding carrier segment 24 upon radial movement of the blade track segment 26 relative to the carrier segment 24 as suggested in FIG. 5. Accordingly, the tandem seals 30 can be maintained in position radially between the blade track segment 26 and the carrier 24 during assembly without having to accommodate circumferential sliding of the blade track segment 26 relative to the carrier 24. The mounting system 28 illustratively includes a plurality of braces 40 and threaded nuts 42 as shown in FIG. 5. Each brace 40 engages the blade track segment 26 and extends through the carrier segment 24. The threaded nuts 42 engage the braces and generally fix both the braces 40 and the blade track segments 26 in place relative to the carrier segment 24 as shown in FIGS. 3 and 4.

The carrier segment 24 included in each shroud segment 22 is formed to include a body plate 50, case hangers 52, and seal supports 54 as shown in FIGS. 3-5. The body plate 50 is illustratively an arcuate plate shaped to extend part-way around the central axis A and formed to include holes 51 through which braces 40 of the mounting system 28 extend. The case hangers 52 are configured to couple the shroud segment 22 to a turbine case or other structure and extend outward in a radial direction from the body plate 50. The seal supports 54 each defines a corresponding seal-receiving channel 35 that receives a tandem seal 30.

The blade track segments 26 of each shroud segment 22 illustratively are the direct gas path interface of the shroud segment 22 and face the hot, high-pressure gasses interacting with the blades 13 of the turbine wheel assembly 11 as suggested in FIG. 2. Each blade track segment 26 is formed to include a runner 60, a plurality of hangers 62, and an aft shoulder 68 as shown in FIG. 5. The runner 60 is arcuate and extends part-way around the central axis as shown in FIG. 5. The hangers 62 each extend outward in the radial direction from the runner 60 and allow for attachment of the blade track segment 26 to the carrier segment 24 via the mounting system 28.

An aft hanger 62 is arranged forward of the retaining ring 75 to block forward movement of the retaining ring 75 along the axis A as shown in FIGS. 2-5. Each hanger 62 illustratively has an L-shaped cross-sectional shape when viewed circumferentially along the runner 60 having a radially extending portion 64 and an axially-extending portion 66. In other embodiments, the hangers 62 may have a T-shape, a fir-tree shape, a dovetail shape, a U-shape, a box shape, or other suitable shape.

Aft shoulder 68 extends radially outward from the runner 60 along an aft edge of the runner 60 to provide a further locating feature for retaining band 75 as shown in FIGS. 2-5. Aft shoulder 68 blocks aft movement of the retaining ring 75 along axis A to keep retaining ring 75 in place relative to blade track segments 26. In the illustrative embodiment, aft shoulder 68 along with aft hanger 62 cooperate to define a channel that receives retaining ring 75.

Figure 6:
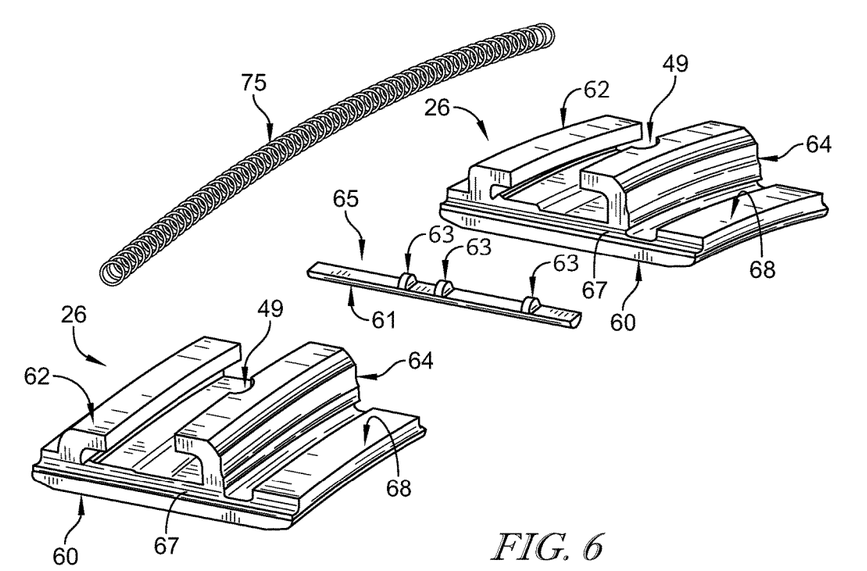
FIG. 6 is a detailed perspective view of a subassembly of the turbine shroud segment shown in FIGS. 1-5 showing that each blade track segment includes a runner adapted to define the primary turbine gas path, attachment hangers configured to support mounting of the blade track segments, and an aft locator shoulder for axially locating the coil spring, and further showing that the sealing elements include a half cylinder portion and locating fins that extend radially outwardly from the half cylinder portion for axially locating the coil spring among other things.
Figure 7:
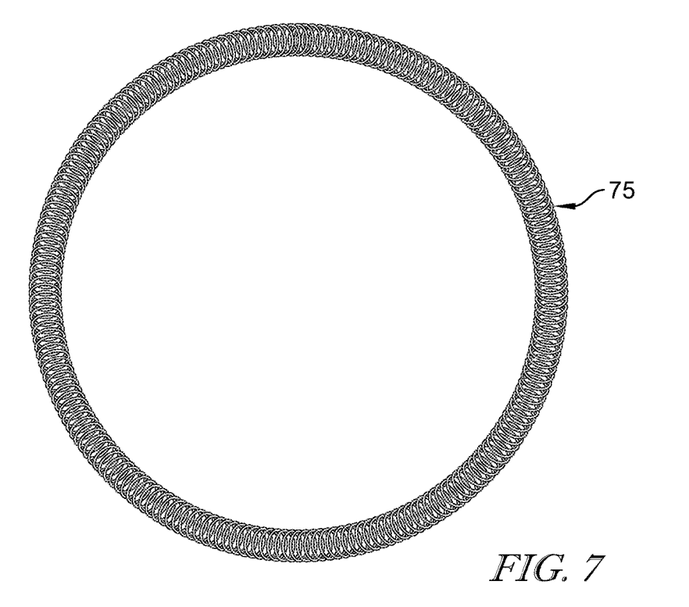
FIG. 7 is a perspective view of the coil spring shown in FIGS. 2-6 showing that the coil spring is a full hoop canted coil spring.

Turning again to the mounting system 28, each brace 40 included in the system 40 illustratively includes a bracket 44 that engages a corresponding blade track segment 26 and a threaded shaft 46 that extends through a corresponding carrier segment 24 as shown in FIGS. 4-6. The brackets 44 illustratively engage axially-extending portions 66 of each hanger 62. The threaded shafts 46 extend from the brackets 44 through holes 51 formed in the body plate 50 of the carrier segment 26. Threaded nuts 42 of the mounting system 28 engage the threaded shafts 46 radially outward of the body plate 50 to secure the braces 40 in place relative to the carrier segment 24.

The brackets 44 of braces 40 included in the exemplary embodiment are arcuate and extend part-way around the central axis A of the engine 10 as shown in FIG. 5. Each bracket 44 has an L-shaped cross-sectional shape when viewed circumferentially along the runner 60 of a corresponding blade track segment 26 such that each bracket 44 has an axially-extending portion 48 and a radially-extending portion 49. The axially-extending portion 41 of the bracket 44 is arranged radially inward of the axially-extending portion 66 of the hangers 62 included in the blade track segments 26. Optional load pads 45 are also included in the bracket 44 and directly engage the hangers 62 of the blade track segment 26. The load pads 45 are circumferentially spaced apart from one another and extend radially-outward from the axially-extending portion 41. In illustrative embodiments, the load pads 45 may be machined to create controlled locating surfaces for positioning the blade track segment 26 relative to the carrier segment 24.

The threaded shafts 46 of the braces 40 are circumferentially spaced apart from one another and extend from the radially-extending portion 49 of the bracket 44 as shown in FIG. 5. In the illustrative embodiment, a central one of the threaded shafts 46 extends substantially perpendicular to the central axis A while the other shafts 46 extend parallel to the central threaded shaft 46. Accordingly, the holes 51 in the carrier segment 24 can be sized to accommodate radial movement perpendicular to the axis A of the shafts 46 during assembly. If each shaft 46 was perpendicular to the axis A, at least one of the holes 51 might have to be formed as a slot to accommodate assembly. In other embodiments, the shafts 46 may not be threaded but may rather be secured by other means (i.e. Bellville washers, pins, clamps, retaining rings, etc.)

In the illustrated embodiment, the braces 40 also include anti-rotation pins 47 as shown in FIGS. 5 and 6. The anti-rotation pin 47 extends into corresponding anti-rotation notches 49 formed in hangers 62 of blade track segments 26 to block circumferential movement of the blade track segment 26 relative to the carrier segment 24. The anti-rotation pins 47 are integrated into shafts 46 of the braces 40 to reduce part count and control tolerances of the segment 22 assembly.

In the illustrative embodiment, the seal-receiving slots 35 are defined at least in part by a ramped surface 37 configured to guide the wire seal 31 into a position engaging both the carrier segment 24 and the blade track segment 26 as shown in FIG. 3. The ramped surface 37 extends both axially and radially to define an acute angle with the central axis A. The rope seal 32, when compressed, and gas pressure applied to the tandem seal 30 push the wire seal 31 along the ramped surface 37 so that the wire seal 31 engages both the carrier segment 24 and the blade track segment 26 such that the wire seal 31 blocks gas from moving past tandem seal 30.

The tandem seals 30 are illustratively made up of exactly two cords of material (wire seal 31 and rope seal 32) but may be made up of more cords in some embodiments. The wire seal 31 is illustratively a single strand of round metallic material that blocks movement of gasses through a gap between the carrier segment 24 and the blade track segment 26. The rope seal 32 is illustratively a compressible seal made of a ceramic-containing core with a braided metallic sheath. Using metallic sheath allows the ceramic-containing core to be damaged and lost over time while allowing the rope seal 32 to continue performing its function even after degradation of the rope seal 32. Single chord seals 33 may also be used in conjunction with tandem seals 30.

In the illustrated embodiment of FIGS. 2-5, the tandem seals 30 are arranged to engage one of the hangers 62 and the runner 60 of the blade track segment 26 as shown specifically in FIG. 2. More particularly, one tandem seal 30 engages a radially outer surface of the axially-extending portion 66 of a hanger 62. A second tandem seal 30 engages a radially outer surface of the runner 60 included in the blade track segment 26 at a location axially between hangers 62. Accordingly, in this embodiment, neither tandem seal 30 is compressed against cantilevered portions of the runner 60 forward or aft of the hangers 62.

One of the carrier seal supports, sometimes called tandem seal receivers, 54 of the carrier segment 24 is located between locating fins 63 of the circumferential seal 65 to axially locate the circumferential seal members 65.

According to the present disclosure, a garter spring type arrangement for the retaining ring 75 would likely be in the form of a canted coil spring. Canted coil springs can be used as seals or for preloading pressure assisted seals. To handle the high temperatures in the proposed location, a high temperature nickel or cobalt alloy would likely be used for this canted coil spring. Waspaloy or Rene 41 are possible alloys.

The coil spring could potentially provide additional sealing capability by reducing parasitic leakages in the engine. It could also control parasitic leakages through machined features (instead of through gaps) and reduce air system variability. The additional sealing capability could be used to provide sealing or discouragement against hot gas ingress from the flowpath at local high pressure areas.

Figure 8:
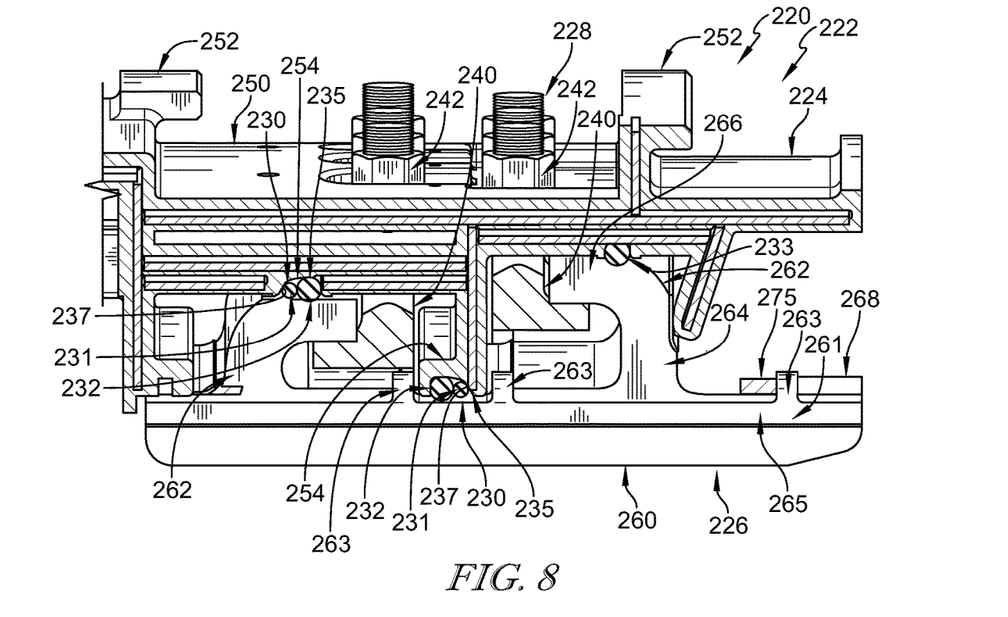
FIG. 8 is a detailed cross-sectional view of a portion a second turbine shroud segment for use in a second turbine shroud assembly similar to that shown in FIGS. 2-5 showing that the second turbine shroud segment includes a split ring in place of the coil spring for retaining the blade track segment sealing elements in place.
Figure 9:
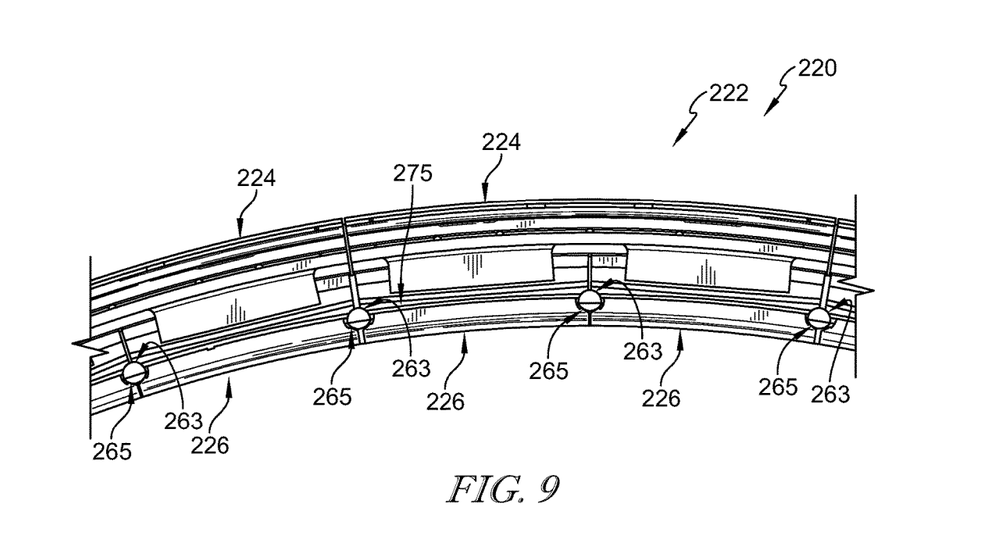
FIG. 9 is a partial aft elevation view of the second turbine shroud segment from FIG. 8 showing that the split ring restrains movement of seal members in the radial direction away from a central axis and out of channels formed by the blade track segments.

A second turbine shroud 220 is shown in FIGS. 8 and 9. The turbine shroud 220 is configured for use in the engine 10 and is substantially similar to the turbine shroud 20 shown in FIGS. 1-7 and described herein. Accordingly, similar reference numbers in the 200 series indicate features that are generally shared between the turbine shroud 20 and the turbine shroud 220 except as modified in the description below and drawings presented. The description of the turbine shroud 20 is hereby incorporated by reference to apply to the turbine shroud 220, except in instances when it conflicts with the specific description and drawings of the turbine shroud 220.

The turbine shroud 220 includes a retaining ring 275 in place of retaining ring 75 as shown in FIGS. 8 and 9. The retaining ring 275 is illustratively a split ring formed to include an expandable gap 279 configured to accommodate thermal growth of the plurality of blade track segments 226.

In the illustrative embodiment, the split ring retaining ring 275 has a rectangular cross section and the expandable gap 279 extends in a substantially axial direction parallel to the axis A through the ring 275. However, in other embodiments, the split ring retaining ring 275 may have a cross sectional shape that is barreled, oval, chamfered, triangular, or any other suitable shape. Also, the expandable gap 279 may be shaped to form an angle relative to axis A, to form a zig-zag shape, to form an overlapping joint, and/or to form an interlocking joint.

Figure 10:
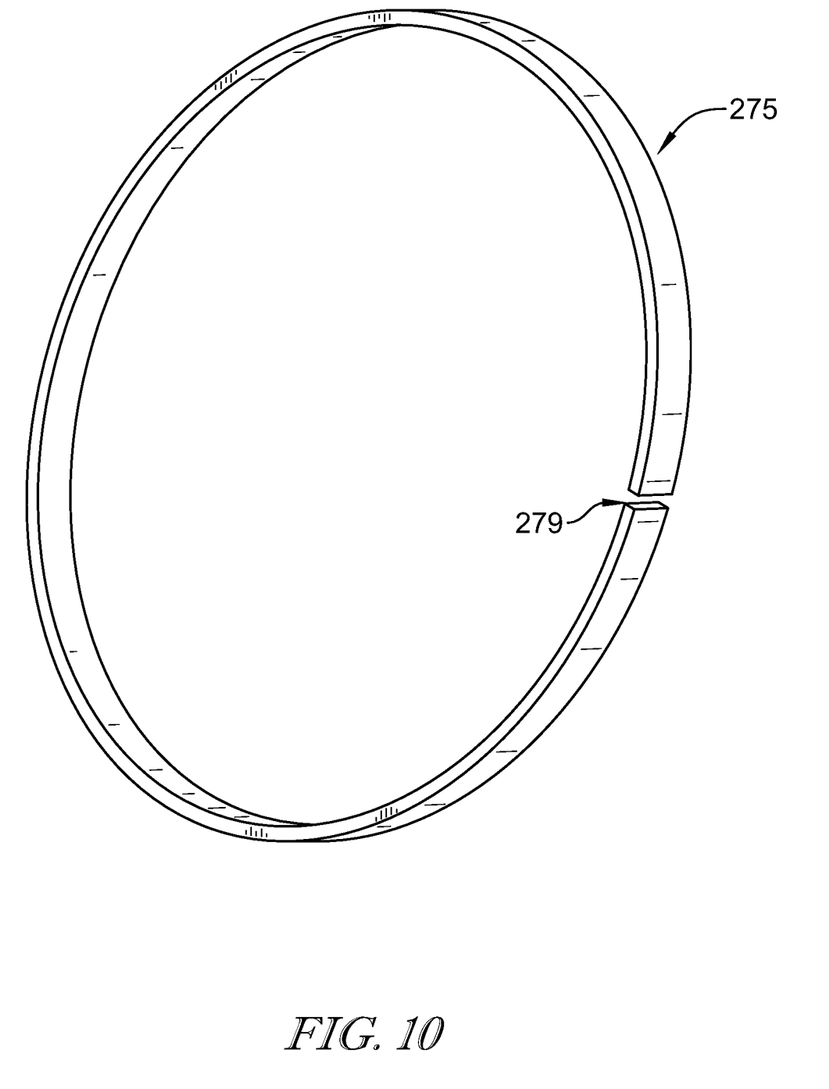
FIG. 10 is a perspective view of the split ring shown in FIGS. 8 and 9 showing that the split ring is nearly a full hoop shaped to include a gap configured to accommodate thermal expansion and contraction of the blade track segments included in the second turbine shroud assembly.

The retaining ring 275 could look similar to a piston ring as shown in FIG. 10. The material of the retaining ring could be a high temperature nickel or cobalt alloy or, if additional temperature resistance is necessary, a monolithic ceramic.

Embodiments of the present disclosure describe ceramic matrix composite parts, such as blade track segments, being implemented in locations traditionally held by metallic components. Ceramic matrix composite parts have high temperature capabilities and do not need as much cooling air. However, the typical sealing arrangements become more challenging to implement due to the differences in thermal growth between ceramic matrix composite parts and metal parts and the difficulty of machining ceramic matrix composite parts. Rod seals, like seal elements 65, 265, can be used to seal between ceramic matrix composite components.

As ceramic matrix composite seal segments 26, 226 of the shown designs move together and apart, the rod seals 65, 265 can move radially outward and inward. In the configurations shown, gravity will assist in seating the rod seals 65, 265 at the top of the engine 10. During operation, pressure counteracts gravity to hold the rod seals 65, 265 at the bottom of the engine in place. But this back side pressure may not build without the rod seals at the bottom of the engine 10 being held in place against gravity while the engine 10 is started. Therefore the rod seals 65, 265 at the bottom of the engine 10 could benefit from retention features for keeping rod seals 65, 265 in place during engine 10 start up.

The present disclosure provides inward springing retaining rings 75, 275 that can keep the rod seals 65, 265 seated against the seal segments 26, 226. The retaining ring 75, 275 is configured such that the force exerted on the rod seals 65, 265 is sufficient to keep the rod seals 65, 265 seated in place, but low enough to spring outward as the seal segments 26, 226 move together and push the rod seals 65, 265 radially outward. The rod seals 65, 265 may include a tab or a stop, like locating fins 63, 263 to keep the ring 75, 275 in place axially and the retaining ring 75, 275 could be placed at a number of axial locations. An alternative embodiments would not have any locating tabs on the rod seal 65, 265 but would simply capture the retaining ring 75, 275 axially between the aft face of the blade track segment or carrier and the forward face of the vane assembly located immediately aft of the segments. However, in reference to the configurations shown, the retaining ring 75, 275 is illustratively placed in the aft section of the rod seal 65, 265 as it can be easily placed once all of the carrier and segment assemblies have been assembled into the case.

Features of the illustrative turbine shrouds 20, 220 could also be implemented in other assemblies adapted for use in gas turbine engines or other machines. For example, circumferential seals 65, 265 and retaining rings 75, 275 could be used between adjacent segmented components such as combustor liner tiles made from ceramic matrix composite materials. In another example, circumferential seals 65, 265 and retaining rings 75, 275 could be used between adjacent segmented components such as exhaust liner tiles made from ceramic matrix composite materials. Accordingly, features of the present disclosure are not limited to the illustrated turbine shrouds 20, 220

Directions described in the present disclosure are generally taken as relative to the central axis A of the engine 10 as would be understood from the drawings. Accordingly, for purposes of understanding the shape and position of components described herein, the radial direction extends perpendicular to or away from the axis A, a axial direction extends parallel to or along the axis A, and a circumferential direction extends around the axis A. While this convention is generally adhered to, there may be particular statements that apply different conventions to enhance understanding of the structures disclosed herein.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly adapted for use in a gas turbine engine, the assembly comprising
    a plurality of blade track segments comprising ceramic matrix composite materials and arranged around a central axis to form an annular shape, each blade track segment including a runner that extends part way around the central axis, and each runner formed to include chamfered surfaces at opposing circumferential ends that extend inward in a radial direction from a radially outer surface of the runner,
    a plurality of seal members arranged in channels formed by the chamfered surfaces of the runners when the plurality of blade track segments are arranged around the central axis, and
    a retaining ring that extends around the plurality of blade track segments and the plurality of seal members, the retaining ring sized to restrain movement of the plurality of seal members in the radial direction away from the central axis and out of the channels formed by the chamfered surfaces of the runners included in the plurality of blade track segments.

2. The assembly of claim 1, wherein the retaining ring is elastic and is configured to expand and contract to accommodate thermal growth of the plurality of blade track segments during use in the gas turbine engine.

3. The assembly of claim 2, wherein the retaining ring is a full hoop coil spring.

4. The assembly of claim 3, wherein the full hoop coil spring engages the radially outer surface of the runner included in each of the plurality of blade track segments.

5. The assembly of claim 4, wherein each of the plurality of blade track segments includes features configured to block axial movement of the full hoop coil spring in at least one direction along the axis to a position out of contact with the plurality of blade track segments.

6. The assembly of claim 1, further comprising a plurality of carrier segments comprising metallic materials, wherein each of the plurality of blade track segments includes at least one attachment feature configured to couple the blade track segment to a carrier segment, and the attachment features extend radially outward from the radially outer surface of the runner.

7. The assembly of claim 6, wherein the retaining ring is arranged aft of the attachment features included in the blade track segments in an axial direction such that the retaining ring is blocked from movement forward in the axial direction to a position out of contact with the plurality of blade track segments by the attachment features.

8. The assembly of claim 7, wherein each of the plurality of seal members includes a portion received in the channels and a locating fin that extends radially out from the channel, and wherein the locating fins are sized and located such that the retaining ring is blocked from movement aft in the axial direction.

9. The assembly of claim 1, wherein each of the plurality of seal members includes a portion received in the channels and a locating fin that extends radially out from the channel, and wherein the locating fins are sized and located such that the retaining ring is blocked from movement in at least one direction along the central axis to a position that allows movement of the plurality of seal members in the radial direction away from the central axis and out of the channels formed by the chamfered surfaces of the runners.

10. The assembly of claim 1, wherein each of the plurality of blade track segments includes features configured to block axial movement of the retaining ring in at least one direction along the axis to a position that allows movement of the plurality of seal members in the radial direction away from the central axis and out of the channels formed by the chamfered surfaces of the runners.

11. The assembly of claim 10, wherein each of the plurality of blade track segments includes features configured to block axial movement of the retaining ring in forward and aft directions along the axis to a position that allows movement of the plurality of seal members in the radial direction away from the central axis and out of the channels formed by the chamfered surfaces of the runners.

12. The assembly of claim 2, wherein the retaining ring is a split ring formed to include an expandable gap configured to accommodate thermal growth of the plurality of blade track segments during use in the gas turbine engine.

13. The assembly of claim 12, wherein the cross sectional shape of the split ring is one of rectangular, barreled, and chamfered.

14. The assembly of claim 12, wherein the gap is shaped to extend parallel to the central axis, to extend at an angle relative to the axis, to form a zig-zag, to form an overlapping joint, or to form an interlocking joint.

15. The assembly of claim 12, wherein each of the plurality of seal members includes a portion received in the channels and a locating fin that extends radially out from the channel, and wherein the locating fins are sized and located such that the split ring is blocked from movement in at least one direction along the central axis to a position that allows movement of the plurality of seal members in the radial direction away from the central axis and out of the channels formed by the chamfered surfaces of the runners.

16. The assembly of claim 12, wherein each of the plurality of blade track segments includes features configured to block axial movement of the retaining ring in at least one direction along the axis to a position that allows movement of the plurality of seal members in the radial direction away from the central axis and out of the channels formed by the chamfered surfaces of the runners.

17. An assembly adapted for use in a gas turbine engine, the assembly comprising
    a plurality of segments comprising ceramic matrix composite materials and arranged around a central axis to form an annular shape, each segment shaped to extend partway around the central axis and formed to include chamfered surfaces at opposing circumferential ends that extend inward in a radial direction from a radially outer surface,
    a plurality of seal members arranged in channels formed by the chamfered surfaces of the segments, and
    a retaining ring that extends around the segments and the plurality of seal members, wherein the retaining ring is sized and arranged to restrain movement of the plurality of seal members in the radial direction away from the central axis and out of the channels formed by the chamfered surfaces of the segments.

18. The assembly of claim 17, wherein the retaining ring is elastic and is configured to expand and contract to accommodate thermal growth of the assembly during use in the gas turbine engine.

19. The assembly of claim 18, wherein the retaining ring is a full hoop coil spring.

20. The assembly of claim 18, wherein the retaining ring is a split ring formed to include an expandable gap.

* * * * *